United States Patent [19]

Giuliani

[11] Patent Number: 4,681,138

[45] Date of Patent: Jul. 21, 1987

[54] VALVULAR DEVICE FOR THE INFLATION OF BALLOONS, PARTICULARLY BALLOONS SUPPORTED BY TUBULAR SHAFTS

[75] Inventor: Giovanni Giuliani, San Michele, Italy

[73] Assignee: VECA S.r.l., San Michele Alessandria, Italy

[21] Appl. No.: 759,122

[22] Filed: Jul. 25, 1985

[30] Foreign Application Priority Data

| Aug. 1, 1984 | [IT] | Italy | 22180 A/84 |
| Dec. 21, 1984 | [IT] | Italy | 24236 A/84 |
| Dec. 21, 1984 | [IT] | Italy | 24222 B/84 |
| Feb. 8, 1985 | [IT] | Italy | 20760 B/85 |
| Apr. 11, 1985 | [IT] | Italy | 21408 B/85 |
| Apr. 11, 1985 | [IT] | Italy | 20305 A/85 |

[51] Int. Cl.$^4$ .............. F16K 15/20; A63H 27/10
[52] U.S. Cl. .............. 137/516.29; 137/533.11; 137/538; 251/367; 446/224
[58] Field of Search ............. 137/516.29, 538, 533.11, 137/515.5; 251/360, 367, 903; 446/220, 224

[56] References Cited

U.S. PATENT DOCUMENTS

| 1,169,804 | 2/1916 | Gregory | 446/224 |
| 1,475,588 | 11/1923 | Lozowsky | 446/224 |
| 1,735,117 | 11/1929 | Kiger et al. | 137/538 |
| 2,981,282 | 4/1961 | Mack | 251/360 |
| 3,162,974 | 12/1964 | Jackson et al. | 446/220 |
| 3,368,302 | 2/1968 | Martino | 446/224 |
| 3,542,062 | 11/1970 | Zahid | 137/538 |
| 3,638,499 | 2/1972 | Saint-Andre | 251/903 |
| 3,720,208 | 3/1973 | Aldrich et al. | 137/538 |
| 4,094,347 | 6/1978 | Ikemoto | 446/220 |
| 4,167,204 | 9/1979 | Zeyra | 446/220 |

Primary Examiner—Alan Cohan
Assistant Examiner—John A. Rivell
Attorney, Agent, or Firm—Bucknam and Archer

[57] ABSTRACT

Device for inflating balloons, particularly balloons supported by tubular shafts, comprising a one-way valve mounted in or at one end of the shaft to be inserted into the neck of the balloon. The valve is provided externally with a projection and rings to deform the neck of the balloon elastically, and ensure the retention of the inflation pressure of the balloon. This sealing may be improved by a tapered sleeve. The valve is made of two parts joined together and forming a cylindrical cavity enclosed by two bases, of which one is smooth surfaced with a central axial hole and the other one is provided with radial ribs and a central axial hole opening into the balloon. A sealing element which may be a thin sheet, a sphere or a hollow piston with tapered element, slides freely in the cylindrical cavity. The valve can also be of a type manually inserted and placed at one end of the supporting shaft.

12 Claims, 23 Drawing Figures

VALVULAR DEVICE FOR THE INFLATION OF BALLOONS, PARTICULARLY BALLOONS SUPPORTED BY TUBULAR SHAFTS

The present invention relates to a valve device for the inflation of balloons, particularly balloons supported by tubular shafts. Balloons made of latex are widely known and available on the market. Since they are made of latex, their surface is extremely deformable. These balloons can assume any desired shape and are provided with an end of reduced diameter, also called the neck, for the insertion of a tubular support shaft.

Once the balloon has been inflated, the air or gas is prevented from escaping by a knot made in the neck region; the end of the neck is thereupon blocked in a cut out made laterally in the circumference of a tapered joint, the base of which is press-fitted into a tubular support shaft. This sealing operation is inconvenient, takes time and does not ensure a perfect hermetic seal. In fact, the balloon, if filled with air, if not stable is not positioned vertically above the shaft. Furthermore, when the balloon is made from material with limited deformability, particularly thin laminar balloons, e.g. polyester of high strength and limited deformability, stretching the neck and knotting become difficult.

Recourse must be made to other types of closure, e.g. clamps or bindings on the neck, beyond the body of the shaft, which do not, however, generally guarantee a perfect seal.

Moreover, the balloon is still likely to roll about and fold on itself. These limited deformability balloons are particularly used for the application of metallized specular surfaces on at least one of the faces, while on the other face are reproduced fairytale or storybook scenes or promotional material for products, teams or clubs or suchlike. In such cases, minimum deformation is required not only to reduce the distortion of the images, but also to improve the handling both for the refilling and for the display in all directions without unintentional or unforseen folding or deflation.

The object of this present invention is to provide a device which ensures the inflation of the balloons without the aforementioned drawbacks and guarantees the firm adhesion of the balloon to the support shaft. According to the present invention, the object is achieved by a one-way valvular device sensitive to low pressures inserted along or at one end of the support shaft, forming the seal on the neck of the balloon. The main characteristics of this one-way valvular device are essentially:

(a) its external shape allows the deformation of the neck of the balloon sufficiently to maintain the inflation pressure and to retain the required pressure, and at the same time to allow the neck of the inflated balloon to be slid over this portion and be extractable to deflate the balloon.

(b) the internal shape is such to allow the insertion at either end, of the outer and handling shaft, and of the internal support shaft; and in the central part, the installion of the one-way sealing system of the inflation fluid. This one-way sealing system consists of a small cylindrical chamber, enclosed by two bases, each centre pierced by a small hole. Of these bases, the base farther from the balloon is perfectly smooth, while the base closer is provided with raised radially crossed ribs.

Between the two bases, spaced by less than the base diameter, there slides a valvular sealing element consisting of a disc of highly elastic material, whose diameter is slightly less than that of the bases and which can move up and down in the cylindrical chamber, guided by the walls, and never turn over or jam crossways.

When the air if blown, in any manner, from the smooth base direction, the elastic valvular element is lifted and forced against overlying ribbed base and so the air flows to the ribs through the edge between the wall and the elastic element. This edge may in case be enlarged by peripheral fins of the elastic body itself.

When, on the cessation of the external pressure, the valvular sealing element is no longer supported, it moves against the lower smooth base and, forced by the counter-pressure, becomes a perfect seal because of its adhesion to the surface of the smooth base. The disc of elastic material, which acts as the sealing element in the valvular device, is not altogether satisfactory in balloons which require extended inflated periods. To overcome this drawback, the sealing disc could be suitably repalced by a small hollow cylinder, sliding in the cylindrical chamber and provided with a tapered plug which would fit into the central hole of the smooth base, and a raised circular rim which grips the surface of said smooth base.

Alternatively, the hollow cylinder could be provided with a raised circular rib which would fit between two circular ribs on the smooth base. A piece of thin, highly flexible material placed between the ribs would ensure a perfect seal.

As has been already said, the external shape of the valvular device of this present invention is such as to stretch the neck of the balloon and so ensure the seal. In the case of large-size balloons, however, and/or of those inflated with helium, the seal between the neck of the balloon and the valvular device can be improved by the use of a sealing sleeve on the outside of the neck of the balloon, easily slid on and off at will.

The cylindrical chamber in which the movable element slides to open or close the communication hole between the balloon to be inflated and the outside, can be obtained into the balloon support shaft. For this purpose, the shaft is divided into two parts and the two ends are heat-formed, in vacuum or by blowing, to obtain two halves of the chambers, which can be fitted together under pressure. After the coupling of the two shaped ends, a chamber is obtained inside which the sealing element slides, while there is, externally, an expanded surface which creates in the neck of the balloon the necessary tension to ensure the seal.

In the case of balloons of limited elastic deformation supported by a hollow shaft, the one-way valvular device of this invention may be placed at the free end of the shaft. In such constructions, it is preferable to use a manually sealed one-way device, where the valve may be closed once the balloon has been inflated, by the insertion of a conical plug by hand into the appropriate air or inflation gas hole in the valvular device. The hollow shaft may be obtaind by drawing and if it is smooth, there may be far too much friction at the neck of the balloon, especially with limited elasticity balloons, or there may be a poor external seal. A remarkable improvement in the external seal may be obtained without renouncing the use of the low-cost drawn shaft, by using a common cylindrical drawn section of constant diameter which, in the area to be inserted into the neck, is preheated and expanded, in accordance with known blowing techniques, within a mould to obtain an expansion, in case with one or more raised annular ribs.

The construction and operating characteristics of the valvular device of this invention may be better understood from the detailed description which follows and in which reference is made to the attached drawings which show some embodiments of this invention, by way of non limiting example, and in which.

With particular reference to FIGS. 1-4, the one-way valvular device 1 of this invention, is inserted into the neck 3 of the balloon 2. Two tubular shafts 10 and 12 are joined to the valvular device, 1, one of which extends to the outside and the other to the inside of the balloon 2. The valvular evice 1 as shown in detail of FIGS. 2, 3 and 4 consists of a lower element 11 to which shaft 10 is press-fitted, and an upper element 14 to which the shaft 12 is press-fitted.

Figures 1, 2, 6:
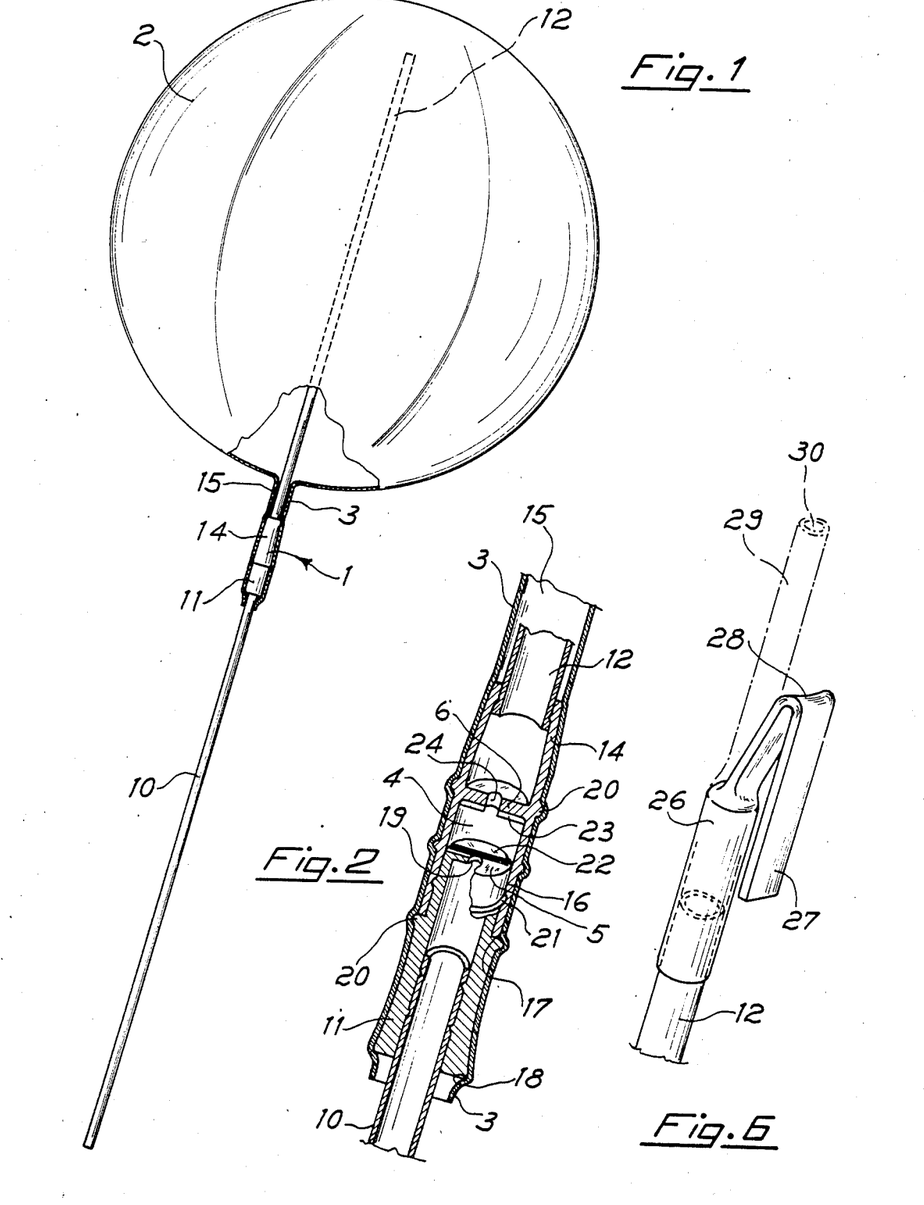
FIG. 1 shows a schematic view of an inflated balloon complete with the valvular device.
FIG. 2 shows a schematic view of a longitudinal section of the disc one-way valvular device installed along the shaft of the balloon of FIG. 1.
FIG. 6 shows a schematic view of another variant of the valvular device with a double tongue sealing element.

The lower element 11 has an end 16 of reduced diameter provided with a snap ring 21 and a stop 17. The upper element 14 is press-fitted onto the end 16 until it abuts against the stop 17. The outer surfaces of the two elements 11 & 14 have slightly raised annular ribs 20 which are forced elastically against the internal walls 15 of the neck 3. The lower element 11 also has a slightly expanded joint 18 in its lower part, to which the wall 15 of the neck 3 grips.

With the annular ribs 20 and the expansion 18 the external seal of the valvular device 1 is assured, while inside the said valvular device 1 there is the valve sealing element.

Figure 4:
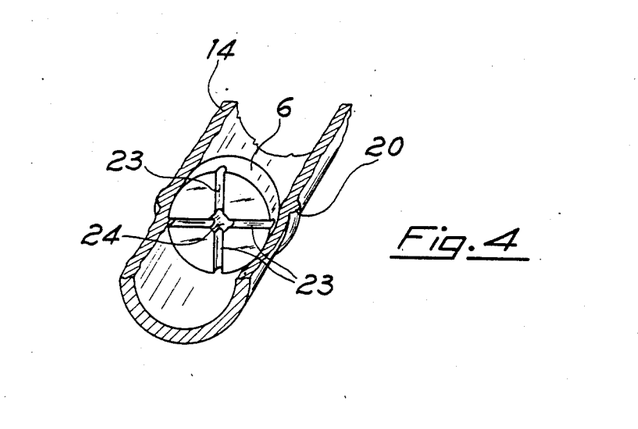
FIG. 4 shows a schematic prospective view of the ribbed base of the air chamber.

The two elements 11 and 14 joined together form a small cylindrical chamber 4 having a diameter equal to that of the end 16 of the lower element 11 and enclosed by two bases, a lower one 5, perfectly smooth and with central hole 19; and an upper one 6, with a series of radial ribs 23 and a central hole 24. The central hole is tapered with a slope of 45°.

Figure 3:
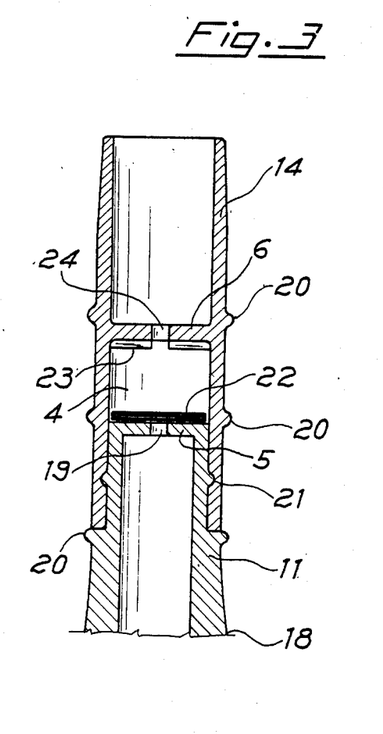
FIG. 3 shows an enlarged schematic view of the longitudinal section of the sealing element of the disc valvular device.

Between the bases 5 and 6 is a very light and flexible disc 22 of elastomer, which may be provided with radial fins to facilitate sliding along the walls. The diameter of the disc 22 is less than that of the end 16 of element 11 but greater that the sum of the diameter of the central hole 19 and the radius of the end 16, so whatever the position, the disc 22 always covers the hole port completely when it is against the base 5.

Figure 5:
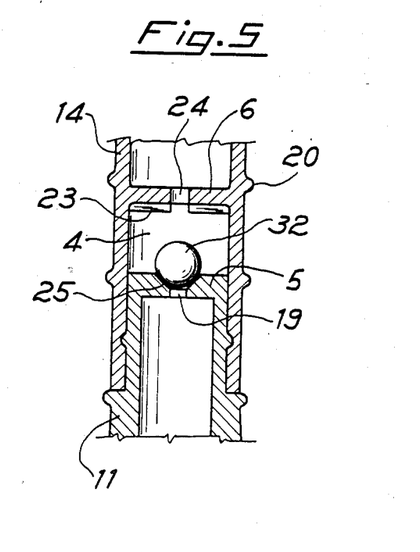
FIG. 5 shows a schematic view of the longitudinal section of a second embodiment of the valvular device with a spheric sealing element.

A possible variant of the valvular cavity 4 is shown in FIG. 5, where the lower base 5 has a perfectly smooth conical seating 25 in the area of the central hole 19, on which seats a smooth sphere 32 of metal or plastic material stiff or elastic, with a diameter sensibly greater than the hole 24. Whatever the variant, the operation of the valvular device is identical. The air which enters from the tublar shaft 10, passes through the hole 19, lifts the sealing disc 22 or the sphere 32, moving them against the radial ribs 23 and enters inside the balloon 2 through the hole 24 and the shaft 12 which, in deflated balloons, prevents the folding of the neck 3 and any kind of throttling.

The air entering the balloon 2 inflates it and creates an overpressure. As soon as the blowing, by mouth or any other means, ceases, the internal overpressure causes the disc 22 or the sphere 32 to return to their smooth seating, creating a perfect seal.

The internal overpressure is not able to loosen the seal on the external annular rings 20 and on the expansion 18 therefore the balloon remains inflated and can be further inflated.

The presence of the internal shaft 12 prevents especially in lenticular balloons waving or, folding on one side, so that the balloons present the desired face in the desired direction, allowing the arrangement of various combinations for amusement or advertising. The internal shaft 12 maintains the median plane of the balloon within the plane passing through the said shaft.

To deflate the balloon, it is sufficient to hold from outside the neck 3 of the balloon against the upper element 14 with one hand, while the laminar section of the neck 3 is pushed along the lower element 11 with the other hand, extracting the valvular element 1 together with the shafts 10 and 12. Another variant of the valvular device described above or an improvement of the seal of the said valvular device may be obtained by threading at the top of the shaft 12 a thin laminar flexible double tongue 26 of molded elastomer.

Without internal pressure this beocmes partially cylindrical but the end part 27 is folded and keeps the bend 28 closed. When air is admitted through the shaft 12 to the balloon 2 the end part 27, formally flat, extends in length and diameter and assumes the vertical positions 29-30 in dashed lines in the drawing, allowing the inflow of the air into the balloon.

When the airflow and external pressure cease, the tongue 27 collapses and resumes its curved form and being compressed by the internal overpressure, creates an optimum valvular seal.

FIGS. 7-12 illustrate a particular type of one-way valvular device with which very long inflation times are possible.

Figure 7:
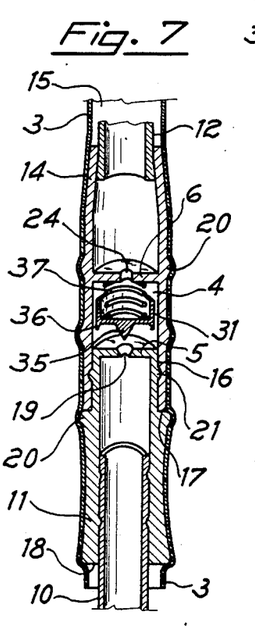
FIG. 7 shows a schematic view of the longitudinal section of another embodiment of this valvular device provided with a conical plug element.

According to this embodiment, a hollow cylinder or piston 31, of diameter slightly smaller than the end 16 of the shaft 10, and shorter than the distance between the two bases 5 and 6, slides in the cylindrical chamber 4 enclosed by a lower base 5 and an upper base 6.

The external surface of the lower base of the cylinder 31 is provided with an axial concial plug 35, having a taper equal to that of the hole 19 and with a slightly raised rim 36. The walls of the cylinder 31 slide with some clearance iside the cylindrical chamber 4 and can occupy the end positions shown in FIGS. 8 and 9.

Figure 8:
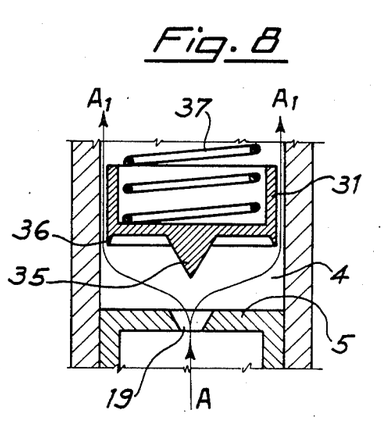
FIGS. 8 and 9 show a schematic view of the conical plug element of FIG. 7 in open and closed positions, respectively.
Figure 9:
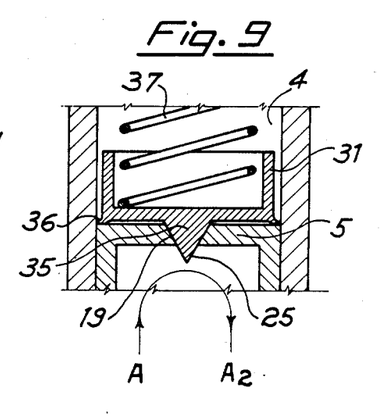

In the position of FIG. 8 the air flows out according to the line A—A'. In the position of FIG. 9, in the absence of the force A, the plug 35 enters the hole 19 under the pressure of the air which tries to flow out. At the same time the rim 36 is pressed against the base 5.

The action of the internal pressure, forcing the valve closed, may be assisted or preceded by the action of a calibrated spring 37 of whatever kind, inserted inside the cavity of the piston 31 and acting against the upper base 6.

Figure 10:
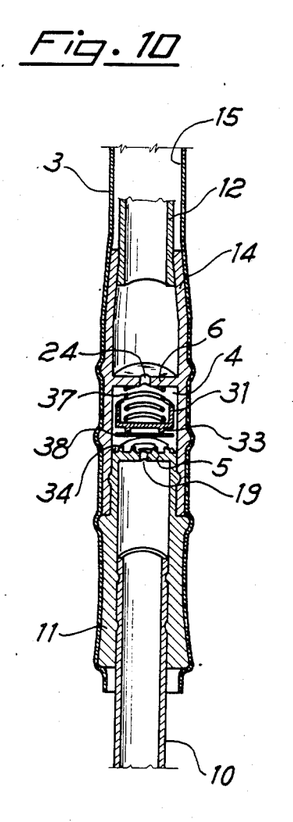
FIG. 10 shows a schematic view of the longitudinal section of another embodiment of this valvular device provided with concentric ring seal.
Figure 11:
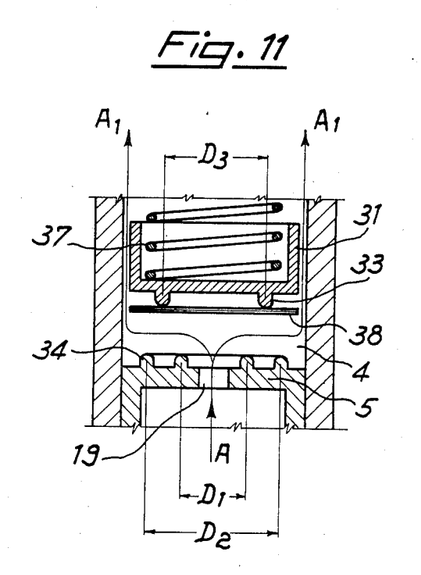
FIGS. 11 & 12 show a schematic view of the sealing of FIG. 10 in open and closed positions.
Figure 12:
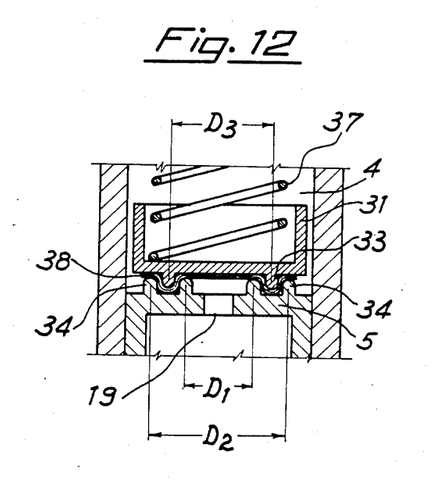

The piston 31 is of elastic material to allow the walls to deform and adhere perfectly to the surface of the base 5. FIGS. 10-12 show another variant with multiple seal.

The variant is essentially constituted by the fact that the cylinder or piston 31 is provided with a circular raised rib 33 on the lower base 5, of diameter D3 while the base 5 is provided upstream with two circular ribs 34 concentric with the central hole 19, of diameter D1 and D2 and of equal projection. The diameter D3 is given by the difference between D1 and D2, so that the circular rib 33 locates between said ribs 34 in the closed position.

There is a very thin flexible lamina 38 between the base 5 and the cylinder or piston 31. This, preferably, is of elastomer or rubber.

When air is pumped in, the situation is as in FIG. 11, where the airflow into the balloon follows the path A—A$^1$, while, when the inflation stops, the counter-pressure of the air built up in the balloon 2 creates the situation shown in FIG. 12, where the seal 38 is compressed and inflected obtaining three sealing points between the ribs 33 and 34, fixed to each other. Also in this embodiment a calibrated spring 37 of whatever kind, to assist or precede the action of the internal air pressure, could be suitably housed inside the piston 31. In both cases the flexion seal of the flexible parts creates sealing points which eliminate the porosity of the moulded parts, allowing inflation times to be increased to many days.

A further extension which renders the seal practically permanent, apart from the diffusion through the material of the various parts, is obtained by inserting a film of impermeable oil between the seal 38 and the base 5, in FIG. 10 between the piston plug 35 and the base 5 in FIG. 7.

The oil, which is inert to oxygen, elastomers and the thermoplastic resins used, creates a permanent and absolute seal and lack of porosity in the areas of compression. Low molecular weight silcone oils or low molecular weight polyisobutylene are particularly suitable in this case, the first being very stable chemically and highly anti-hygroscopic, the second being also sufficiently adhering.

For large balloons, particularly if they are inflated with helium, it is advisable to secure the seal between the two elements 11 and 14 of the valvular device 1 with an external sealing sleeve, shown in FIGS. 13-17. to this end, the seal between elements 11 and 14 is assured through snap rings 21 and by shaping the lower element 11 in the form of a sleeve. In particular, with reference to FIGS. 13-15, the lower element 11 is surrounded by a hollow outer tapered projection 39, having a diameter increasing from the area of the stop 17. The end 40 of the element 11 is sufficiently elastic and thin to be slightly deformed by the force of insertion of the shaft 10. Between the projection 39 and the end 40 there is a tapered cavity, preferably stiffened by four ribs 41. The tapered projection 39 easily slides within walls 15 and creates a strong force around the upper edge, thus ensuring a good seal, even for helium, a gas necessary for balloons, however large, which are self-supporting or lifting.

Figure 13:
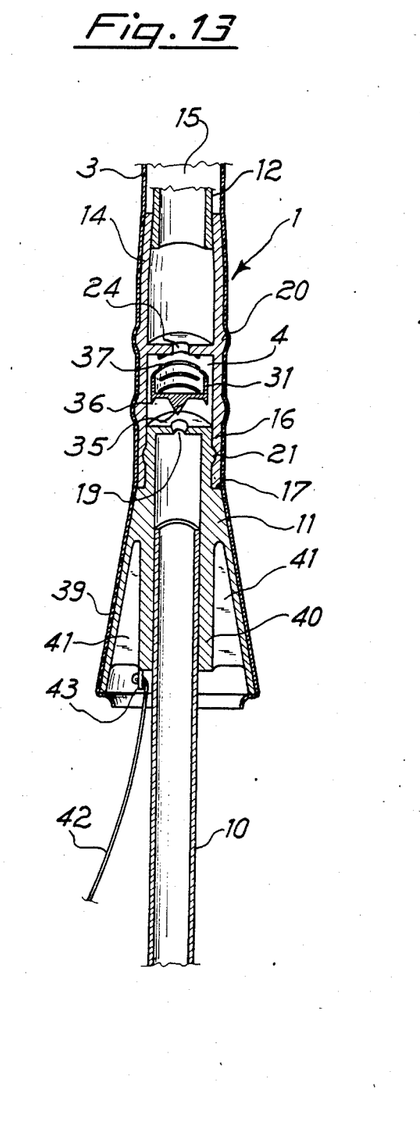
FIG. 13 shows a schematic view of a vertical section of the sleeve applied directly to the body of the one-way valvular device shown in FIG. 7.
Figure 14:
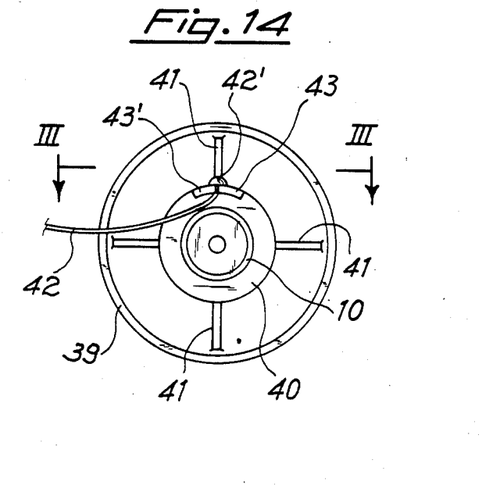
FIG. 14 shows a schematic view of the sleeve of FIG. 13 shown from below, i.e. from the gas inflow side.
Figure 15:
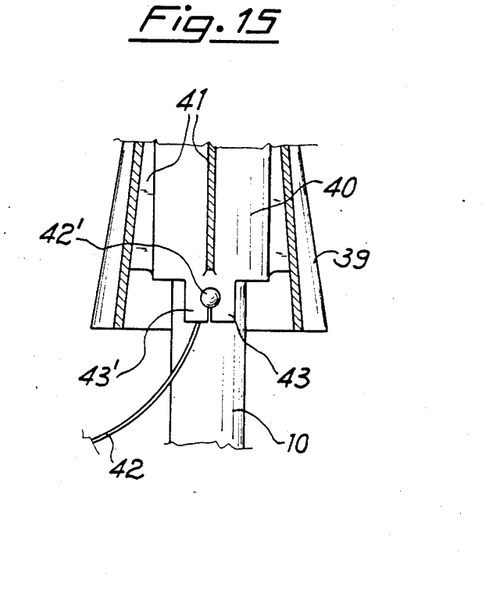
FIG. 15 shows a schematic view of the longitudinal section taken along the line III—III of FIG. 14.

To prevent balloons from escaping and to allow them to rise above the height of the supporting shaft 10, the balloon 2 can be provided with a cord or string. This is provided inexpensively by a cord 42 with a knot 42' at the end held between the two retaining plates 43 and 43', obtained by moulding and integral with the shaft 40.

Figure 16:
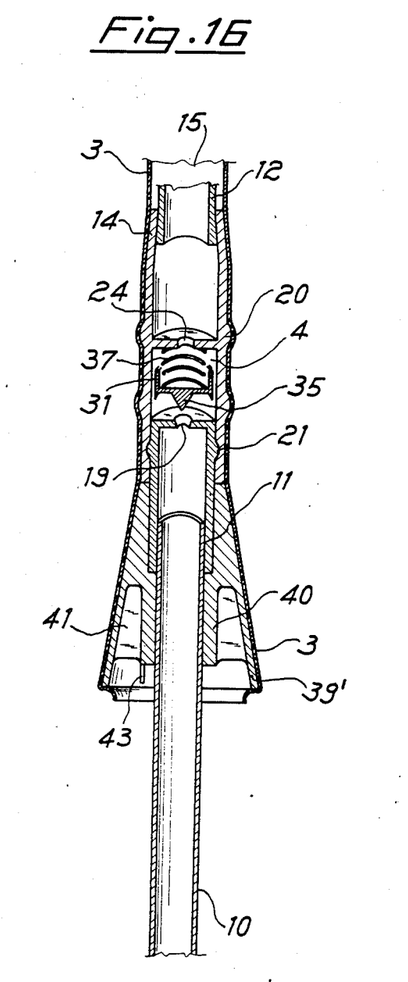
FIG. 16 shows a schematic view of the longitudinal section of an additional sleeve applied onto the complete valvular device.
Figure 17:
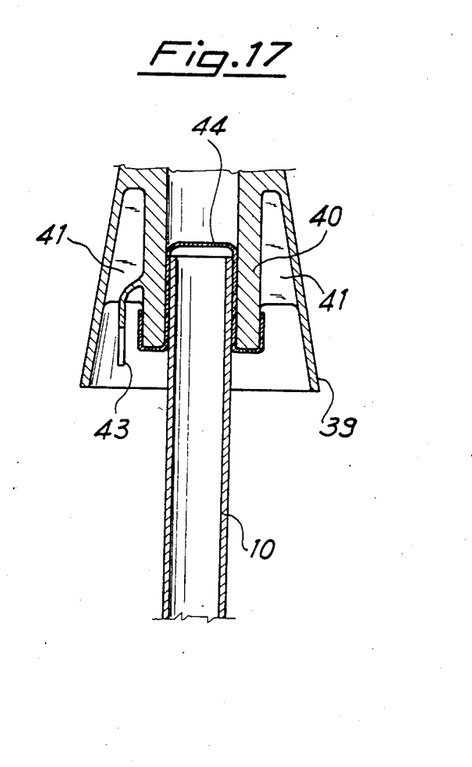
FIG. 17 shows a schematic view of the sleeve of FIG. 16 further rendered airtight by a double ring dead end seal for sealing the balloon chamber from the gas inflow shaft.

The projection 39 could also be formed from a mould or put on by pressure on the extension of the upper element 14 of a valvular device as illustrated in FIG. 16. In this embodiment the projection 39' is provided internally with a seating for the insertion of the lower element 11.

A further improvement of the seal may be obtained by the optional insertion of a thimble seal 44 (see FIG. 17) consisting of a double ring dead end seal, in which the outer ring adheres to the internal body of the cylinder 40 and the inner dead end ring is tightly compressed between the internal walls of the cylinder 40 and the hollow shaft 10 creating an absolute seal for helium.

Figures 18, 19, 20:
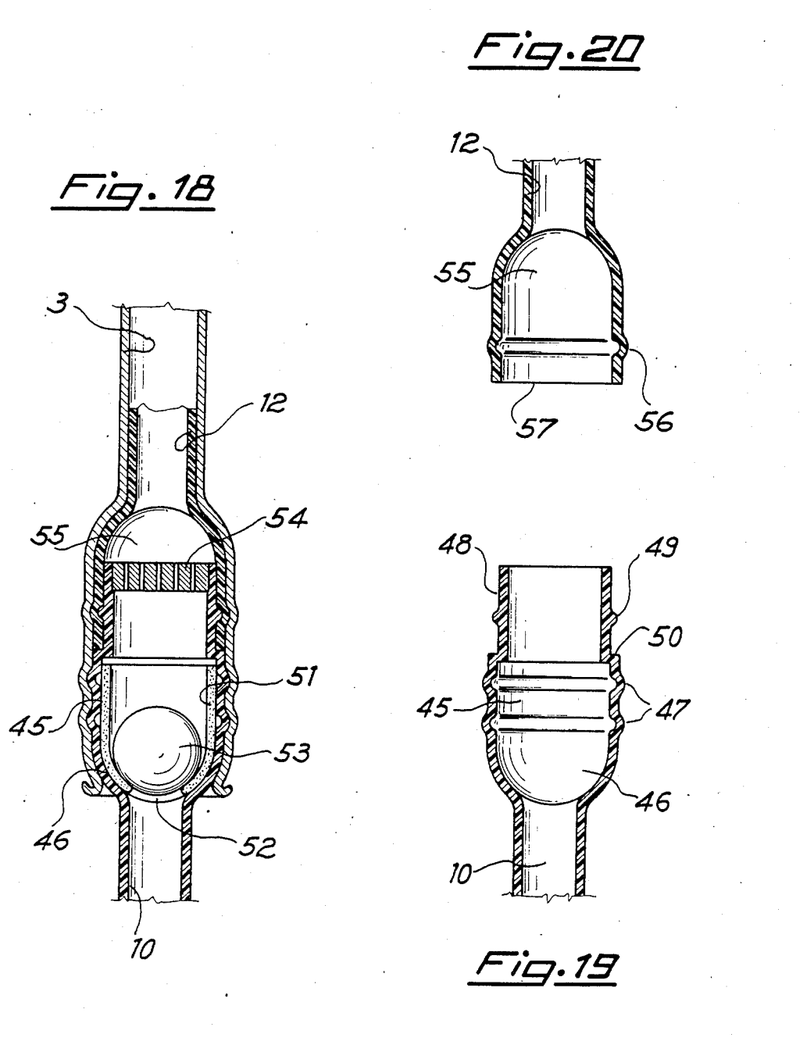
FIG. 18 shows a schematic view of the longitudinal section of a valvular device obtained directly by forming the hollow shaft.
FIG. 19 shows a schematic view of the pugging element chamber of the valvular device of FIG. 18.
FIG. 20 shows a schematic view of the upper part of the chamber of FIG. 19.

The cylindrical chamber 4 of the valvular device 1 may also be obtained directly on the support shaft by heat-forming the ends of the shafts 10 and 12 as shown in FIGS. 18-20.

In particular, the two shafts 10 and 12 are made of plastic material and the end of the external shaft 10 is heat-formed under vacuum or pressure, into a cylindrical chamber 45, with bottom 46 of essentially spherical shape, provided externally with annular rings 47 and terminating in a second cylindrical section 48, of reduced diameter with respect to the chamber 45, the difference being preferably equal to twice the thickness of the expanded walls. On the external surface of the said end section 48 there are one or more rings 49.

Between the two cylindrical sections 45 and 48 there is a stop 50. Below the stop 50 and inside the expanded chamber 45, there is a soft conformator 51 provided with a central opening 52 and whose internal diameter is equal to the diameter of the reduced section 48. In the conformator 51 is housed a polished heavy sphere 53, whose diameter is slightly less than said conformator, which rests on the seating on the opening 52 and blocks it completely.

The sphere 53 is retained in the conformator chamber 51 by a grille 54 which closes the cylindrical section 48.

The internal shaft 12 is shaped in its turn into a second chamber 55 with almost spherical bottom and cylindrical wall provided with annular ribs 56 at a distance from the edge 57 such that when said chamber 55 is inserted into the cylindrical section 48 of the shaft 10 and edge 57 reaches the stop 50, the rib 56 matches exactly the annular protuberance 49 and create a reciprocal connection between shafts 10 and 12. The coupling between the expansions of the two shafts creates a continuous external surface, with several annular protuberances 47 and 56 to retain the neck 3 of the balloon 2 which is deformed as it is slid over them.

The air, inflowing through the hole of shaft 10, pushes the sealing sphere 53 up until it reaches the grille 54. Thus, the air passes through the hole 52 and the grille 54 and inflates the balloon.

When the desired level of inflation is reached and air flowing from 10 is no longer pushing, the sphere 53 falls back on the opening 52 of conformator 51 and the counterpressure of air contained in the balloon blocks it firmly on the seating of the hole 52, obtaining thereby a perfect seal. This seal could be improved by coating the surface of the sphere 53 and of the conformator 51 with a film of non percolating and non oxidizing oil. A variant is a heavy sphere covered by a layer of soft elastomer. In that case the use of the soft conformator 51 would be unnecessary.

The one-way valvular device of this invention, could also be mounted on the free end of the external shaft 10 of the balloon. According to the embodiment shown in FIGS. 21 and 22, the valvular device comprises a cylindrical slider, with an outer sheath 58 with a larger diameter inlet end enlargement 59 and a bottom with a gauged hole 60 at the opposite end.

Figures 21, 22:
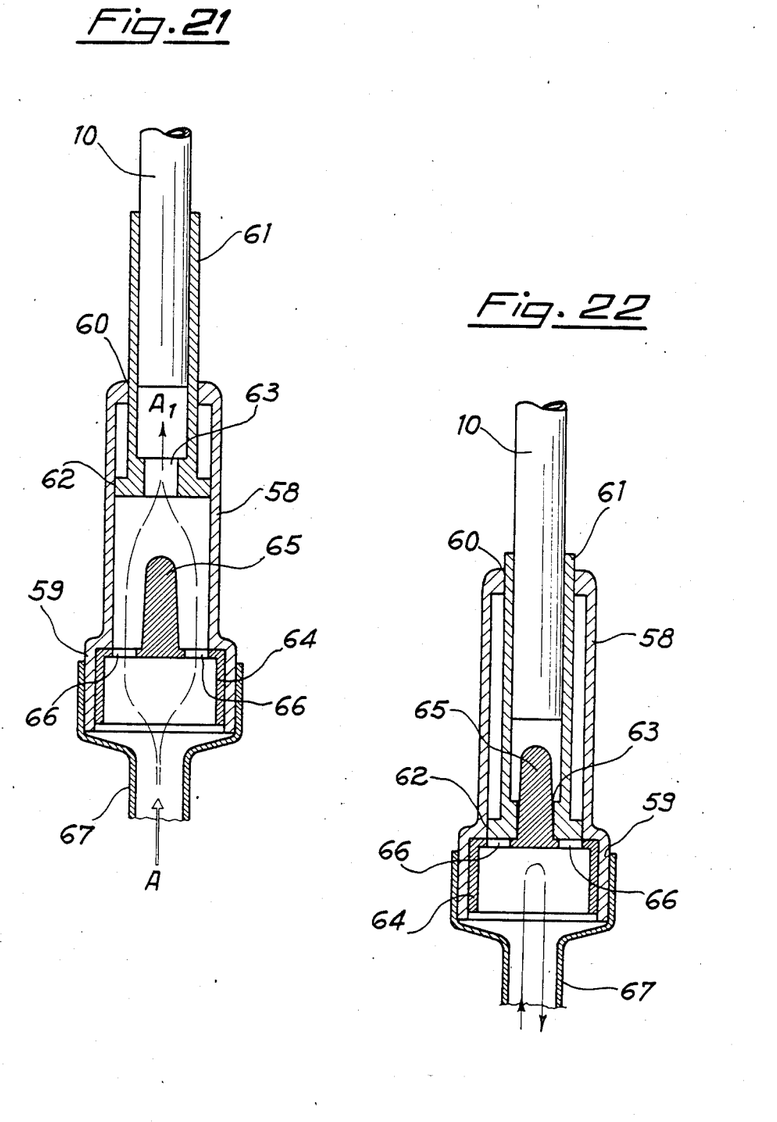
FIGS. 21 & 22 show schematic views of another embodiment of the valvular device provided with a plugging element in open and closed positions.

Within the sheath slider 58, the hollow cylinder 61 can slide; at the upper end of said cylinder there is the sealing coupling seat for the hollow shaft 10, while, at the lower end, there is a circular stop 62 provided with a precisely gauged hole 63.

The stop 62 provides the stop in the upper part of slider 58 around the gauged hole 60.

Inside the end enlargement 59 there is a cylindrical cavity with an upper stop. Into this cavity is press-fitted a hollow cylinder 64, provided on its upper surface with a slightly tapered plug 65 with a rounded tip and coaxial with axis of the hollow piston 61 and the opening 63.

Around the tapered plug 65 there are several air inlet openings 66. At the end of the enlargement 59 it is possible to fit the house 67 of any inflation system.

In the arrangement shown in FIG. 21, air flows unobstructed from the hose 67 through the shuttering device in the direction A—A' into the balloon. At the desired inflation pressure, the shaft 10 and piston 61 are held in one hand, while the other hand pushes the slider 68 and therefore cylinder 64 towards piston 61 until tapered plug 65 enters the gauged hole 63 of stop 62. At this point, since piston 61 is made of more elastic material than tapered plug 65 and slider 58, there is a slight deformation of the stop 62 which at the same time seals the sheath slider 58 and the tapered plug 65 and therefore completes the general seal of the device.

Figure 23:
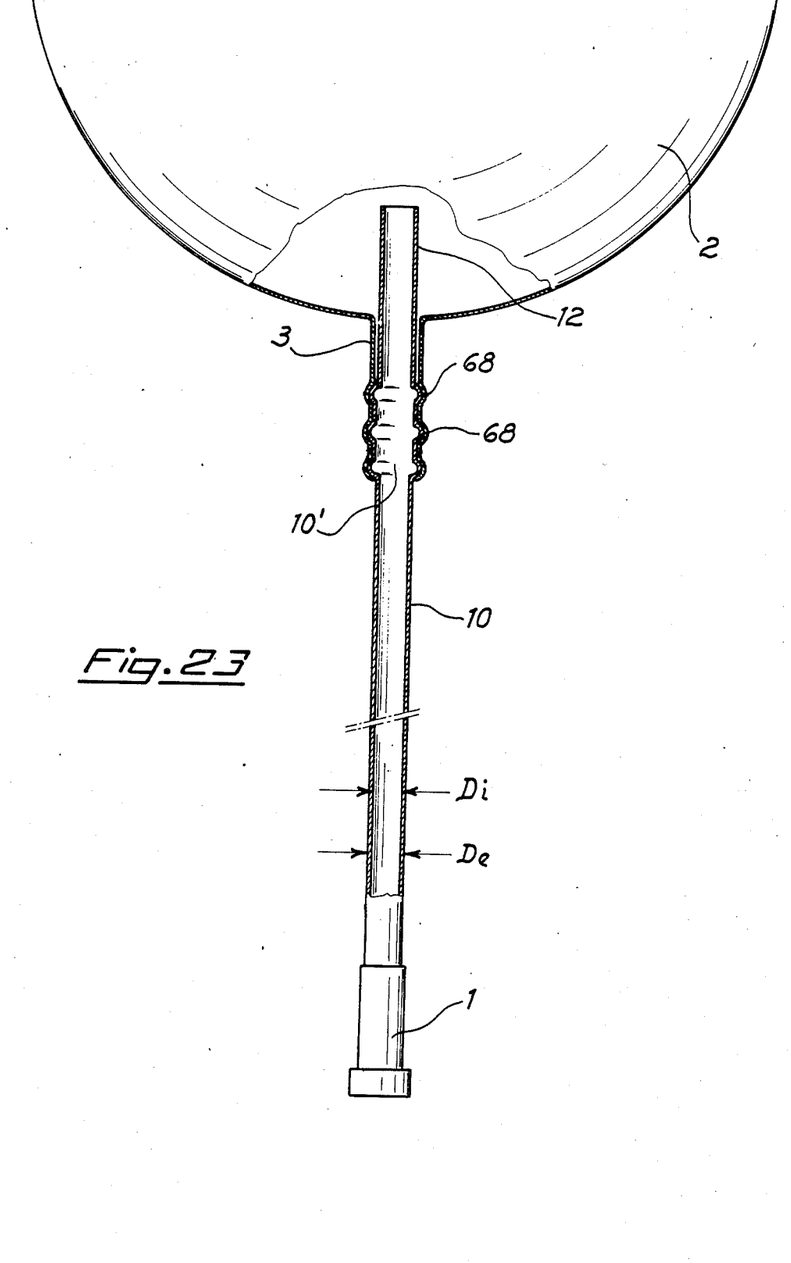
FIG. 23 shows a schematic view of the support shaft particularly adapted to be used with the valvular device shown in FIGS. 21 & 22.

FIG. 23 shows a drawn smooth hollow shaft 10, shaped in such a way as to improve the seal between the neck 3 of the balloon 2, particularly useful when the valvular one-way device 1 is of the slider type shown in FIGS. 21 and 22. The shaft 10 is obtained by drawing a thermoplastic material and has a constant outer diameter De and inner diameter Di. In the central area 10' on which the neck 3 of the balloon 2 is widened, the shaft has an enlargement with a diameter Dm greater than De.

The central area 10' may be provided with annular ribs 68 of increased diameter. All this is obtained by blow or vacuum expansion enlargement after heating up to thermoplasticization of a constant diameter drawn piece, as is known in the art.

When the expanded section 10' enters the neck 3, it slides easily therein because of the limited and jointed deformation areas, creating however locally a sufficient tension to give the sealing pressure.

What I claim is:

1. A device for inflating a balloon, wherein a fluid is introduced into the balloon to reach the desired inflation pressure, the balloon having a neck, the balloon being supported by tubular shafts, one shaft extending to the exterior and the other into the interior of the balloon, and a one-way containment system for the inflation fluid, which comprises a one-way valve, mounted in or at one end of the tubular shaft which extends to the exterior of the balloon and inserted into the neck of the balloon; a said valve having an external shape which deforms the neck of the balloon elastically and assures maintenance of said inflation pressure, while allowing sliding inside said neck, and an inner shape which allows the insertion of said shafts, and the installation of the one-way containment system for the inflation fluid in the central section, said valve comprising an upper part and a lower part, said lower part having ribs to seal the neck of the balloon, the upper part forming the one-way valve, said shaft which extends to the exterior of the balloon being press-fitted against the lower part, said shaft which extends into the interior of said balloon being press-fitted against said upper part and wherein said upper part and lower part of said valve form a cylindrical cavity enclosed by two bases, the base farther from the balloon having a first central axial hole and the base closer to the balloon being provided with a second central axial hole, said bases being spaced by a distance less than the diameter thereof, said one way containment system comprising a sealing element freely slidable in said cavity and having a diameter less than the diamter of each of said bases and greater than the sum of the radius of either of said bases and the diameter of said first central hole.

2. The device according to claim 1 wherein the sealing element is a smooth sphere of plastic or metallic material with a diameter greater than the second central hole.

3. The device according to claim 1 wherein the hole in the base farther from the balloon is tapered and the sealing element is a hollow piston provided with a tapered element having the same tapering as that of said first central axial hole.

4. The device according to claim 3, wherein the hollow piston is provided with a circular peripheral flexible foldable skirt.

5. The device according to claim 3 wherein the hollow piston is provided with a circular rib with diameter D 3 and the base farther from the balloon is provided with two concentric circular ribs with diameter D1 and D2, respectively and wherein $D3 = D2 - D1$.

6. The device according to claim 5 wherein a thin, flexible elastomer sheet is placed between the piston and the base farther from the balloon.

7. The device according to claim 3 wherein a calibrated spring is located in the hollow piston and said spring abuts against said base closer to the balloon.

8. The device according to claim 1 wherein the valve is comprised of two parts press-fitted together with a blocking ring, each part being provided with a cylindrical seating for sealing insertion of said shaft extending towards the exterior for the support and inflation of the balloon and said shaft extending towards the interior, said balloon has a medial plane, said hollow shaft which extends towards the interior maintains the medial plane of the balloon within a plane passing through the shaft, respectively.

9. The device according to claim 1 wherein the lower part of the valve is sleeve shaped and composed of an outer, hollow, tapered projection with increasing diameter, said projection and said lower part of the valve forming a cavity, reinforcing ribs are located in said cavity.

10. The device according to claim 9, wherein the lower part of the valve is provided with two flaps for supporting a flexible balloon guide element.

11. The device according to claim 9 wherein said projection forms a seating for insertion of the lower part of the valve.

12. The device according to claim 9 wherein a thin thimble ring is threaded onto said shaft extending towards the outside of the balloon.

* * * * *